June 27, 1939.  W. S. HILBORN  2,164,011
ORCHARD HEATING SYSTEM
Filed May 13, 1937
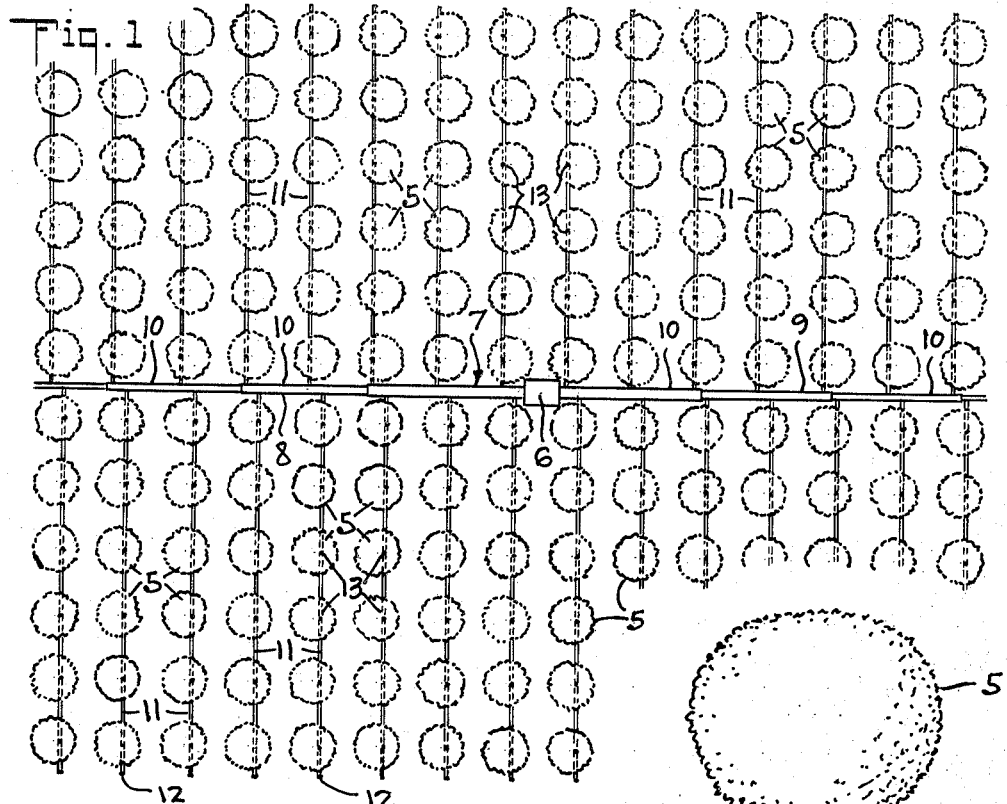
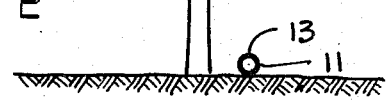
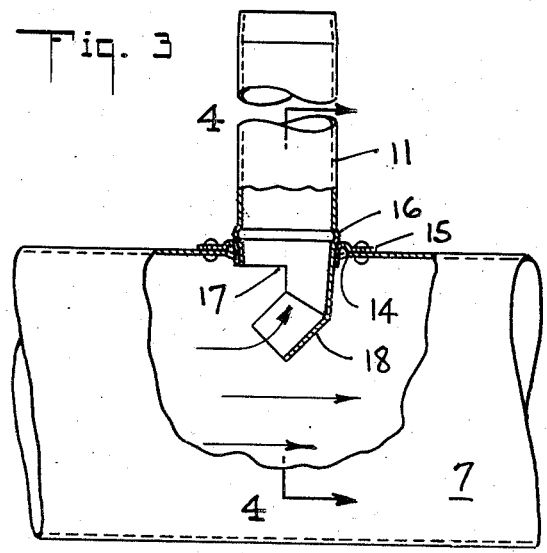
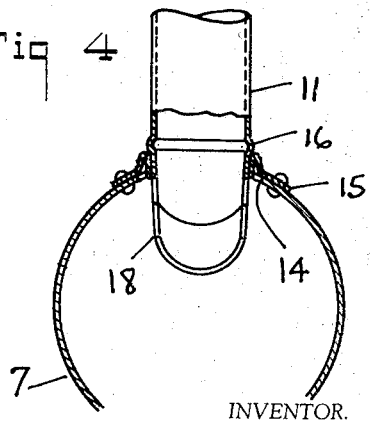
INVENTOR.
Walter S. Hilborn
BY Joseph F. Westall
ATTORNEY.

Patented June 27, 1939

2,164,011

UNITED STATES PATENT OFFICE 2,164,011

ORCHARD HEATING SYSTEM

Walter S. Hilborn, Covina, Calif., assignor to Donald F. Ainslee, Ontario, Calif.

Application May 13, 1937, Serial No. 142,332

3 Claims. (Cl. 47—2)

This invention relates to orchard heating systems whereby heat is applied to each tree comprising the orchard individually from a single heat-productive unit.

The citrus groves of California, as well as those of many other regions, usually well adapted to the growing of fruit-bearing trees and other perennials, are occasionally visited by frosts which most often occur during the early morning hours of still nights after a period of heat radiation from the ground and trees, which creates a stagnant moisture-laden frigorific zone throughout the grove. Efforts to protect orchards from the stunting and killing effects of such frosts have resulted in the utilization of numerous heating devices and warm-upper-air deflecting means, many of which are objectionable because of excessive initial or operating costs.

As a single brief chill will sometimes ruin a crop or even the grove of trees itself, it is imperative that reliable and universally usable systems provide a wide margin of safety as to the amount and facility of heat generation and distribution to insure positive protection to the grove against sudden, unpredictable, or unusually severe drops in temperature.

It is common practice to utilize oil-burning heaters for each tree, commonly known as "smudge pots", which, due to their costly inefficiency in fuel consumption, produce clouds of smoke, obnoxious to the entire district and of no practical use in warding off frost or otherwise protecting the grove. In areas where used extensively, it has been found that such heating devices, while adapted to raise the temperature several degrees by the heat generated, often tend to prolong a frigid period due to the quantity of smoke which overhangs the grove during the day following the use of the smudge pots, and through which the heat rays of the sun cannot effectively penetrate, preventing the absorption of such heat by the ground and the re-vitalization of the trees necessary to minimize the effect of the subsequent night's temperature. The cost of individual tree heaters adapted to efficiently burn inexpensive fuel and avoid the production of objectionable smoke is prohibitive.

It is a principal object of the present invention to provide an orchard heating system whereby individual trees are protected from frosts by heat produced in a single centrally located furnace of maximum efficiency in the consumption of fuel, to thus avoid the disadvantages and inefficacies of the prior art indicated above, in combination with distributing means for the heat so generated to all parts of the grove, which are adapted to obviate entirely loss of the heat by radiation.

Another object is the provision of a system embodying a network of conduits disposed on the surface of the ground under the trees to which said conduits are adapted to convey fluids, heated in a single centrally located orchard furnace, adapted to utilize normal radiation of heat from the conduits as an auxiliary thermal expedient.

Another object is to provide means of connecting a plurality of conduit sections by their frictional engagement with each other to enable their quick assembly when needed, and ease of the dissembly and removal to facilitate usual care of the grove.

Other highly important objects and salient features of my invention will be obvious to those of skill in this art, such, for example, as a conservation of fuel and labor required for its operation; economy of manufacture and installation; durability and adaptability to any grove topography or range of temperature, upon examination of the following description read in the light of the accompanying drawing, in which:

Fig. 1 is a plan view of an orchard showing my invention installed therein;

Fig. 2 is an enlarged view of one of the trees of the orchard shown in Fig. 1 illustrating the means of my invention for conveying heat to each tree thereof;

Fig. 3 is an enlarged sectional view of the connection between the principal heat conductive main and each of a series of branch conduits;

Fig. 4 is a sectional view taken on line 4—4 of Fig. 3.

Referring to the drawing in detail, the numerals of which indicate similar parts throughout the several views, 5 designates a plurality of trees of the orchard shown in Fig. 1 which the present invention is adapted to protect from frosts and the detrimental results of excessively cold weather. Centrally located in the orchard is a furnace 6 of any type well known in the art for heating clean air. The heated air from the furnace 6 is carried through the grove by a main 7 comprising straight conduits 8 and 9, extending from opposite sides of the furnace to the edges of the orchard at right angles to rows of trees thereof. A pump or blower (not shown) is provided adjacent the furnace to force hot air from the furnace into the conduits 8 and 9. Each of the conduits consist of a plurality of sections 10 of successively smaller diameter from the furnace to the edge of the orchard.

Under each row of trees 5 flanking main 7 is a pipe 11 having one end connected, by means hereinafter more in detail described, to one of conduits 8 and 9 and the other end closed by a plug (not specifically shown) as at 12.

In pipes 11 below each tree 5 one or more openings 13 are provided from which the heated air of the furnace passed through the main is discharged to raise the temperature throughout the grove. The main 7 and pipes 11 may be composed of any material well known in the art, or may be wrapped or covered with insulating material to minimize radiation of heat therefrom and preserve the temperature of fluids discharged from openings 13 directly below each tree.

A removable connection of the pipes 11 to the main 7 permits the disassembly and storage of the pipes when not needed to thereby facilitate cultivation, cleaning, and irrigation of the grove. To this end an opening 14 is formed in the side of each main in alignment with each row of trees, disposed at right angles thereto, under which it is desired that a pipe 11 extend. Each of holes 14 is lined with an annular collar 15 riveted or otherwise secured to the main. Pipes 11 are inserted into respective holes 14 and are frictionally engaged by the collar 15 to resist their displacement.

An annular boss 16 is raised on the outer wall of each pipe 11 a distance from the end of the pipe substantially equal to the width of collars 15, and is adapted to limit, by its abutment against the edge of the pipe encircling collar 15, the extension of each pipe into the main.

One half of the end of the circular wall of each pipe 11 is extended beyond the opposite half, which is cut at right angles to the longitudinal axis of the pipe as indicated at 17, the extension 18 being curved inwardly to overhang the bore of the pipe. Each pipe is inserted into its respective opening 14 and collar 15 in the main with the extension 18 thereof at the rearward side of the pipe with respect to the direction of the heated air and gas flow through the main, to divert a portion of the heated fluids passing under pressure through the main into each successive pipe from the furnace 6 to the end of the main. It will be obvious that the proportionate quantity of the heated fluids diverted into each pipe may be varied by rotation of the pipe which moves the deflector extension 18 at a different angle with respect to the direction of the flow of fluids through the main.

The openings 13 in each of the pipes for the emission of heat therefrom to the trees individually are of different sizes, depending upon their distance from the main, opening 13 nearest adjacent the main being relatively small, with successive openings toward the end of the respective pipes uniformly increasing in size to thereby compensate for the gradual reduction in pressure toward the end of the pipe as the fluids are drawn off through said openings.

It will thus be seen that I have provided an efficient unit heating system for orchards in which conduits are provided to convey heat from a centrally located furnace to each, individually, of a plurality of trees, the tendency towards uneven distribution of heat due to the differences in the proximity of the furnace with respect to the different trees being obviated by the restricted conduits and discharge openings therein without the use of complicated and costly valvular means. Radiation of heat from the pipes 11 and main 7 will be as effective in raising the temperature throughout the grove and eliminating the tree growth-retarding temperatures and frost as will the heated fluids ejected directly under the foliage of each tree.

While I have described but one embodiment of my invention, it will be obvious that numerous changes in size, shape, or proportion of the various parts, or of the whole system with respect to the grove to be heated, as, for example, in the disposition of the furnace with respect to the grove; and that any conventional means for connecting the pipe 11 to the main may be substituted for the connection shown; and that the quantity of heated fluid diverted into each pipe may be varied by proportioning the diameter of the pipes with respect to the pressure at each opening in the main, thus obviating the necessity of employing the extension 18,—all without departing from the spirit of my invention as defined in the appended claims.

What I claim and desire to secure by Letters Patent is:

1. In a device for heating orchards, a furnace disposed centrally in said orchard to heat clean air drawn from the orchard, a main extending from opposite sides of said furnace to respective opposite sides of said orchard for the flow of clean heated air from said furnace, said main having a series of lateral openings therein, a collar lining each of said openings, a series of laterally extending pipes extending rotatably into said collars, respectively, and a plurality of deflectors in the bore of said main secured to said pipes respectively to divert heated air from said furnace into said pipes.

2. In a device for heating orchards, a furnace centrally located in said orchard, a pair of mains comprising connected sections of different diameters extending from opposite sides of said furnace and exposed to the air in said orchard, the diametrically larger section of each main being connected to said furnace, said main having a series of lateral openings therein, a collar lining each of said openings, a series of laterally extending pipes exposed to the air in said orchard each having one of its ends extending rotatably into said collars, respectively, a plurality of deflectors in the bore of each main secured to said pipes, respectively, so as to rotate therewith and variably divert heated air from said furnace into said pipes, each of said pipes having a plurality of spaced holes therein, said holes being successively larger from the point of connection of said pipes with said respective mains, the air around said mains and said pipes being heated by radiation therefrom.

3. In a device for heating orchards, a furnace disposed centrally in said orchard, a main extending from each of two opposite sides of said furnace, each of said mains having a series of lateral openings therein arranged alternately in opposite sides of respective mains, a collar lining each of said openings, a pipe extending through each of said collars into said respective mains, said collars frictionally engaging said pipes to resist the rotation of said pipes, a portion of the end of each pipe within the respective mains being extended and bent to overhang the bore of the pipe to form an air deflector, the velocity of air movement from said mains through said pipes individually being varied by rotation of the respective pipes.

WALTER S. HILBORN.